United States Patent
Tysklind et al.

(10) Patent No.: US 8,332,561 B2
(45) Date of Patent: *Dec. 11, 2012

(54) NETWORK ADAPTER, METHOD, AND COMPUTER PROGRAM PRODUCT

(75) Inventors: Johan Tysklind, Enskede (SE); Jan Backman, Danderyd (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,525

(22) Filed: Mar. 13, 2012

(65) Prior Publication Data

US 2012/0174091 A1    Jul. 5, 2012

Related U.S. Application Data

(63) Continuation of application No. 12/256,657, filed on Oct. 23, 2008, now Pat. No. 8,161,218.

(51) Int. Cl.
*G06F 13/00* (2006.01)
*G06F 9/44* (2006.01)
*G06F 9/445* (2006.01)

(52) U.S. Cl. ........ 710/302; 711/104; 717/169; 717/170; 717/174

(58) Field of Classification Search .................. 710/302; 711/104; 717/169, 170, 174
See application file for complete search history.

(56) References Cited

U.S. PATENT DOCUMENTS

| | | | |
|---|---|---|---|
| 6,427,178 B2 | 7/2002 | Collin et al. | |
| 6,986,073 B2 | 1/2006 | Liu | |
| 7,143,198 B2 * | 11/2006 | Lee et al. | 710/2 |
| 7,164,886 B2 * | 1/2007 | Mowery et al. | 455/41.2 |
| 7,366,589 B2 | 4/2008 | Habermas | |
| 7,634,772 B2 | 12/2009 | Parthasarathy et al. | |
| 7,664,128 B2 | 2/2010 | Kurihara et al. | |
| 7,681,193 B2 | 3/2010 | Oprea et al. | |
| 7,945,906 B2 | 5/2011 | Bourke-Dunphy et al. | |
| 2002/0091843 A1 * | 7/2002 | Vaid | 709/230 |
| 2004/0255145 A1 | 12/2004 | Chow | |
| 2006/0130045 A1 | 6/2006 | Wesley et al. | |
| 2006/0223553 A1 | 10/2006 | Reisgies | |
| 2007/0240155 A1 | 10/2007 | Shlomai | |
| 2007/0260763 A1 | 11/2007 | Kasama | |
| 2008/0016197 A1 * | 1/2008 | Hardy et al. | 709/223 |
| 2008/0132279 A1 | 6/2008 | Blumenthal | |

(Continued)

FOREIGN PATENT DOCUMENTS

EP    1 843 545 A2    10/2007

(Continued)

OTHER PUBLICATIONS

International Search Report and Written Opinion issued in the corresponding international application No. PCT/EP2009/054686 mailed Aug. 13, 2009, 8 pages.

*Primary Examiner* — Paul R Myers
*Assistant Examiner* — Christopher A Daley
(74) *Attorney, Agent, or Firm* — Harrity & Harrity, LLP

(57) ABSTRACT

A network adapter for plugging into a host computer is provided. The network adapter may include an internal memory and connection means for connecting the host computer to a communications network. The network adapter may include resident application software stored in the network adapter's internal memory, whereby the resident application software automatically activates when the network adapter is plugged into the host computer.

20 Claims, 2 Drawing Sheets

U.S. PATENT DOCUMENTS

| | | |
|---|---|---|
| 2008/0141380 A1 | 6/2008 | Ikeda |
| 2008/0244254 A1 | 10/2008 | Cromer et al. |
| 2009/0082694 A1* | 3/2009 | Poisner .................... 600/552 |
| 2009/0119657 A1 | 5/2009 | Link |
| 2009/0150680 A1 | 6/2009 | Buchanan et al. |
| 2009/0164601 A1* | 6/2009 | Swartz .................... 709/217 |
| 2009/0244167 A1 | 10/2009 | Saita et al. |
| 2009/0323673 A1 | 12/2009 | Gabbay et al. |
| 2010/0106832 A1 | 4/2010 | Tysklind et al. |

FOREIGN PATENT DOCUMENTS

| | | | |
|---|---|---|---|
| WO | WO 2007/054447 A1 | 5/2007 |

\* cited by examiner

NETWORK ADAPTER, METHOD, AND COMPUTER PROGRAM PRODUCT

RELATED APPLICATION

This application is a continuation of U.S. patent application Ser. No. 12/256,657, filed on Oct. 23, 2008 now U.S. Pat. No. 8,161,218, the disclosure of which is incorporated by reference herein.

TECHNICAL FIELD

The present invention generally relates to a network adapter, a method, and a computer program product for making a user aware of available application software (also called "end-user programs") and, more particularly, to providing a user with application software.

The expression "network adapter," as used herein throughout, is intended to include any communications network connection device that is configured to connect to a computer. The network adapter may, for example, be a modem, a network card, a PC card, a USB mobile device, an ExpressCard, etc.

BACKGROUND

Application software is a type of computer software that directs the capabilities of a computer to a task that the computer user wishes to perform. Current application software often includes a Web-based component, and there is an increasing trend towards online applications rather than stand-alone software that is configured to run on a contained/closed system, such as a personal computer ("PC").

Many device vendors and service providers group multiple applications, such as a word processor, a spreadsheet, and several other applications, together as a package. The separate applications in a package typically have a user interface that makes it easier for a user to learn about and use the individual applications. The process of installing application software onto a computer may, however, be time-consuming and require technical skills beyond those of a typical user.

Furthermore, as competitiveness between device vendors and service providers continues to increase, the volume of available application software is increasing at a very fast rate and it is consequently becoming more difficult to make users aware of available application software and for users to learn of application software of interest to them.

SUMMARY

Embodiments of the present invention facilitate use of a computer.

For example, a network adapter may be provided for plugging into a host computer, which may include an internal memory and connection means for connecting the host computer to a communications network, such as a computer network and/or a telecommunications network. The network adapter may include resident application software stored, at least in part, in the network adapter's internal memory, whereby the resident application software is configured to be automatically activated when the network adapter is plugged into the host computer. The network adapter-resident application software may therefore be automatically activated each time the network adapter is used to connect the host computer to a communications network (simultaneously therewith or sequentially thereto).

A user of such a network adapter may therefore work on any compatible host computer using preferred application software without having to configure the host computer or manually install any application software. Such a network adapter may therefore simplify the start-up procedure for a user since a user need only plug a network adapter into a host computer and wait for the telecommunications network connection to be made and for the resident application software to be activated, before being able to access an application.

It should be noted that the expression "host computer" as used in this document is intended to refer not only to a computer, such as a PC or laptop, but to any device that manipulates data according to a list of instructions, which device may be connected to a telecommunications network. Such a device may include a camera, a personal digital assistant (PDA), a games console, a media player, a mobile telephone, or the like.

The expression "plugged in," as used herein, is not limited to physically connecting a network adapter to a host computer. Rather, the expression is intended to refer to a network adapter connection, by any wired or wireless means, to a host computer in such a way that connection of the host computer to a telecommunications network and activation of network adapter-resident application software are enabled.

The term "activated," as herein, is intended to mean that the network adapter-resident application software is configured to be initiated when the network adapter according to the present invention is plugged into the host computer: An icon or window can, for example, be configured to pop-up on the display unit of the host computer to indicate to a user that a particular application is available and/or may be executed. The application software may be activated without requiring any additional action on the part of the user, other than simply plugging the network adapter into a compatible host computer. Alternatively, the network adapter-resident application software may be configured to offer a menu of available applications to a user, whereby a user has to select an application(s) to access, for example, by clicking on a drop-down menu item.

According to an embodiment of the invention, the network adapter may be configured to automatically run the resident application software from its internal memory without the application software being uploaded and/or installed on the host computer. Alternatively, the network adapter may be configured to automatically install the resident application software on the host computer, whereby the application software is executed on the host computer. In the latter case, the network adapter may be configured to allow a user to the option to choose (i.e., select) whether to uninstall the resident application software after unplugging the network adapter from the host computer.

It should be noted that the resident application software may be configured to be partially uploaded and/or installed on the computer and may thereby be run from both from the network adapter and/or the host computer.

According to an embodiment of the invention, the resident application software may be configured to be automatically de-activated and/or automatically uninstalled, when the network adapter is unplugged from the host computer.

According to another embodiment of the invention, the network adapter may be configured to store data associated with the application software. The network adapter may be configured to store any changes to data associated with the application software—which changes result from data processing by the microprocessor of the host computer—in the network adapter, rather than in the host computer. Data may therefore be physically held in the network adapter and cannot be accessed by a third party (e.g., using the host computer) unless the third party comes into possession of the network adapter. The network adapter may be configured to store changes substantially continuously, for example, every second or less, or periodically, such as every few seconds or every minute.

Embodiments of the invention enable the network adapter to be disconnected from the host computer at any time without loss of data integrity and without requiring a dedicated shutdown procedure prior to disconnection. The network adapter may subsequently be reconnected to the same or a different host computer to recommence data processing. The host computing environment may therefore be changed (when a user changes location or when he/she works from different offices for example) while the application software and any data associated therewith remain intact. In other words, the network adapter, according to embodiments of the present invention, may be substantially self-contained and require only the addition of a service environment provided by a host computer in order for the application software and any other data stored in the network adapter to be accessed.

An advantage of arranging a network adapter to use its internal memory to run application software and to store all changes to data associated with the application software therein, is that potentially confidential and/or personal information (or otherwise sensitive information) will not be permanently copied into a host computer's memory storage and thus potentially compromised. That is, information copied to a host computer is vulnerable to potential access by a subsequent user (even after deletion), as is currently the case when using a computer on which application software has been preinstalled. It should particularly be noted that even when a user deletes a file on a conventional computer's hard drive, the data stored magnetically on the hard drive is not normally deleted therefrom until it is overwritten by different data, which might not take place for quite some time after the file has apparently been deleted. In many cases, deleted data can be recovered using commercially available software tools, typically, without much effort and/or using sophisticated recovery techniques.

The above-described problem is overcome, however, by using the network adapter according to the present invention. Even though a part of the network adapter resident application software may temporarily be copied into a host computer's RAM for operation thereon by the microprocessor of the host computer during the use of the network adapter according to the present invention, this storage is volatile and will not leave a permanent trace or record of processor activity associated with the executed resident application software when the host computer is shutdown and/or when the network adapter is disconnected from the host computer.

According to another embodiment of the invention, the network adapter may include means, such as a slot, for temporarily and/or permanently receiving a memory means, such as a memory card. Resident application software and/or data associated therewith may be stored at least in part on the memory means.

According to a further embodiment of the invention, the network adapter may include a broadband network adapter. The network adapter according to the present invention may, however, include any type of network adapter, such as a narrowband/phone-line dialup network adapter, a radio network adapter, and/or a voice network adapter.

According to an embodiment of the invention, the network adapter may be portable, e.g., small and light relative to the host computer, and/or small and/or light enough to be readily transported by a user.

According to another embodiment of the invention, the network adapter may include updating means configured to search for or identify and/or download a newer/more updated version of the resident application software and/or new application software when the network adapter is plugged into the host computer and thereby update and/or modify the resident application software automatically (either periodically or each time the network adapter is used) and/or on demand from the user or device vendor/service provider.

According to a further embodiment of the invention, the internal memory may include a non-volatile memory and the resident application software may be stored, at least in part, in the non-volatile memory. According to an embodiment of the invention, the internal memory may include a read-write memory and the resident application software, and optionally any data associated therewith, may be stored, at least in part, in the read-write memory.

According to another embodiment of the invention, the network adapter may include a security feature that is configured to check the identity of a user before the resident application software is activated/run to prevent unauthorized access. Such an identity check may include the request of a password, the use a biometric sensor, such as a retinal or fingerprint scanner, or a SIM-card reader integrated with the network adapter.

According to a further embodiment of the invention, the resident application software may include a communications network-based component, such as a Web-based component, for example, the application software may include an online application.

The present invention may provide a method for making a user aware of available application software and/or for providing a user with application software. The method may include the steps of providing an internal memory of a network adapter, which includes connection means for connecting a host computer to a telecommunications network, with resident application software and arranging the resident application software to be automatically activated when the network adapter is plugged into the host computer. Such a method provides an effective, user-friendly way of advertising application software to users while at the same time making computers easier and more convenient for users to use, i.e., user-friendly. Further embodiments of the method are provided in the accompanying independent claims.

The present invention may provide a computer program product containing computer program code to make a host computer execute the steps of a method according to any of the embodiments of the present invention.

BRIEF DESCRIPTION OF THE DRAWINGS

The present invention will hereinafter be further explained using non-limiting examples with reference to the appended schematic figures.

It should be noted that the drawings have not been drawn to scale and that the dimensions of certain features have been exaggerated for the sake of clarity.

DETAILED DESCRIPTION OF EMBODIMENTS

Figure 1:
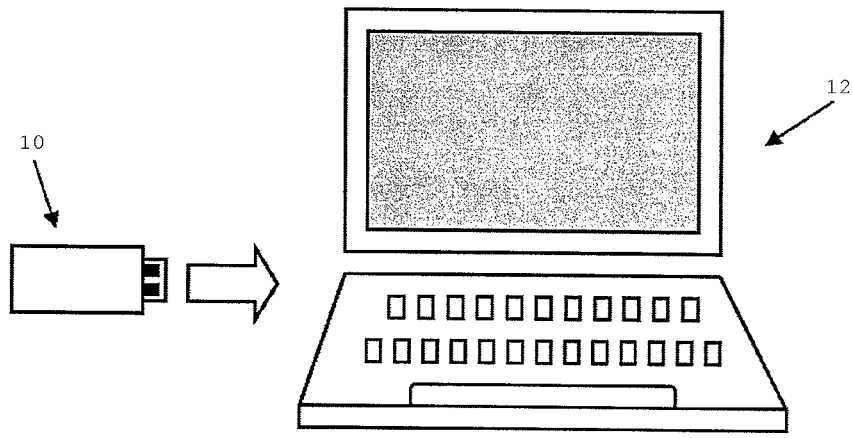
FIGS. 1-3 show a network adapter according to an embodiment of the present invention being plugged into and disconnected from a host computer.

FIG. 1 shows a portable broadband network adapter 10, such as a modem, according to an embodiment of the present invention being releasably plugged (i.e., inserted) into a host computer 12.

A modem may include any device that modulates an analog carrier signal to encode digital information and/or demodulates such a carrier signal to decode the transmitted information. The result may be to produce a signal that can be transmitted easily and decoded to reproduce the original digital data. Modems can be used over any means of transmitting analog signals, from driven diodes to radio. Conventionally, modems may perform the following functions: receiving and transmitting signals; converting signals from digital to analog or vice-versa (i.e., modulation or de-modulation of signals); compressing and decompressing data and changing a single stream of data into bits to be placed on a system bus. Modems have not been utilized to store application software to the author's knowledge.

Figure 2:
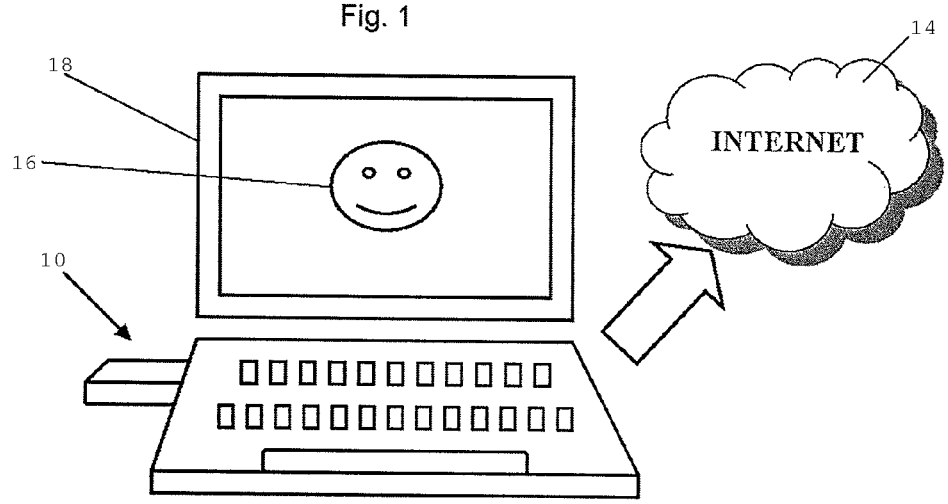

FIG. 2 shows that once network adapter 10 has been plugged into host computer 12, network adapter 10 automatically connects host computer 12 to a communications network 14 (e.g., a telecommunications network) and automatically activates network adapter-resident application software. An icon 16 or a window may, for example, be configured to pop up on a display unit 18 of the host computer 12 to make a user aware of the application software available to the user.

Network adapter 10 may be configured to automatically execute the network adapter resident application software from its internal memory using the operating system and microprocessor of host computer 12. Alternatively, network adapter 10 may be configured to automatically install the resident application software on host computer 12.

Figure 3:
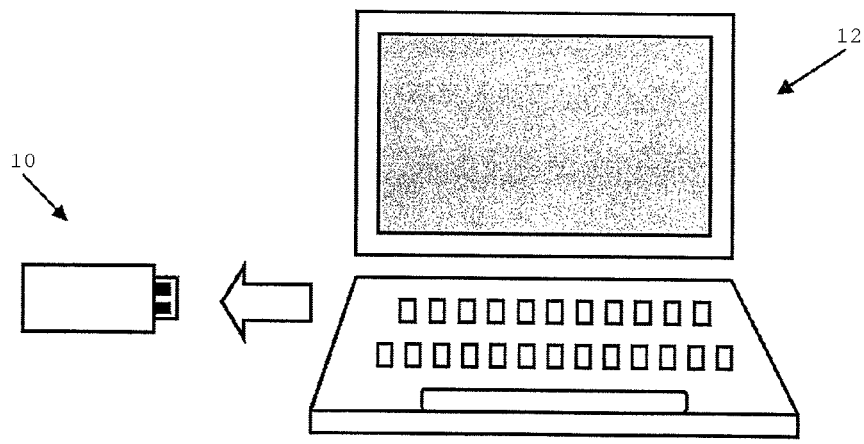

FIG. 3 shows network adapter 10 being unplugged (i.e., disconnected) from host computer 12. Upon disconnection, the network adapter-resident application software may be automatically de-activated and/or un-installed leaving no trace or recoverable indicia, for example, of hosting activity on host computer 12.

It should be noted that if an established communications network connection is lost and/or actively broken by a user, network adapter 10 may be configured to re-activate the network adapter-resident application software on re-establishment of the communications network connection without a user having to physically un-plug network adapter 10 from host computer 12 and then plug it in again.

It should also be noted that even though the figures show network adapter 10 as external to host computer 12, network adapter 10 may, according to embodiments of the present invention, form an integral part of host computer 12, whereby the plugging in and disconnection of network adapter 10 would take place internally to host computer 12.

Figure 4:
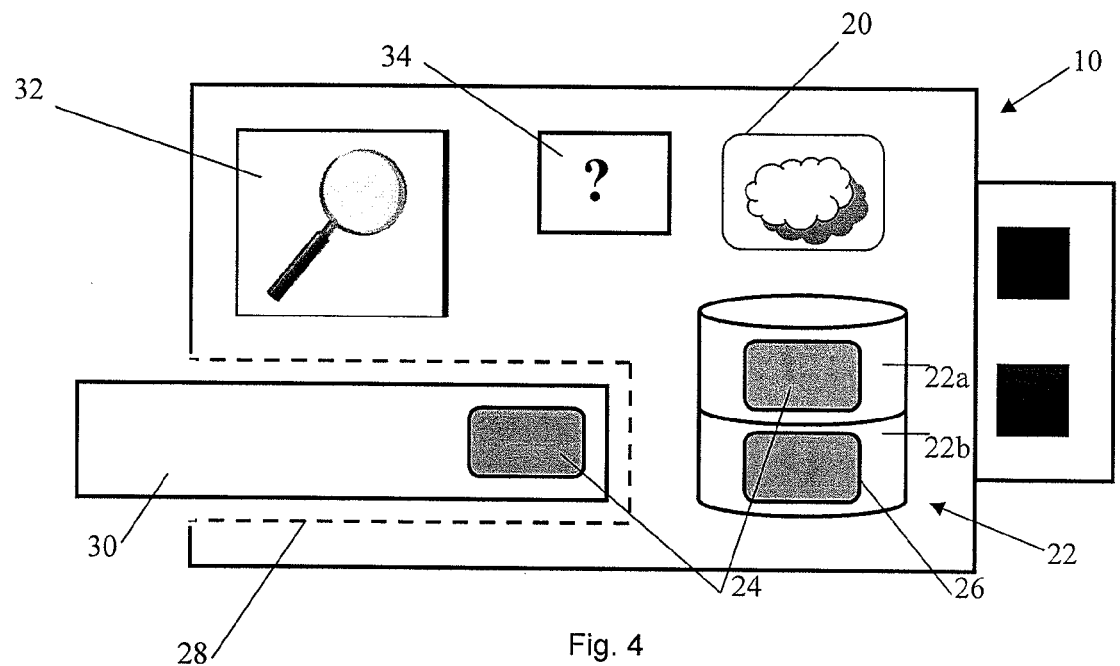
FIG. 4 shows a network adapter according to an embodiment of the invention.

FIG. 4 schematically shows network adapter 10, according to an embodiment of the present invention, for plugging into host computer 12. Network adapter 10 may include a connection arrangement 20 to connect host computer 12 to communications network 14, and an internal memory 22. Internal memory 22 may be divided into two parts in the illustrated embodiment; a non-volatile memory 22a, in which a resident application software 24 may be stored, at least in part, and a read-write memory 22b, in which resident application software 24 and/or data 26 associated therewith may be stored.

Network adapter-resident application software 24 may be configured to be automatically activated when network adapter 10 is plugged into host computer 12, and may include one or more of the following applications: a music and/or video application, a game application, a Voice over Internet Protocol (VoIP) application, a word processor, a spreadsheet, and/or a picture processing application, etc. Data 26 associated with resident application software 24 may include one or more of the following: a written document, a picture, a database and its contents, a music file, or any other data.

If resident application software 24 includes a game application, for example, network adapter 10 may be configured to store all of the application software necessary to run (or play) a given game in its internal memory, such as graphics and sound processing software. Network adapter 10 may also be configured to store player high scores, user preferences, and/or similar performance configuration data. Once network adapter 10 has been plugged into host computer 12 and an Internet or other network connection has been made, the game application may be automatically activated without requiring any further action on the part of a user before being operable. Alternatively, or additionally, network adapter 10 may be configured to automatically activate an online service, such as Internet banking.

Network adapter 10 may include a receiving means 28, such as a slot, for receiving a memory device, such as a memory card 30 on which resident application software 24 may also be stored in part. Memory card 30 may alternatively and/or additionally provide extra memory on which data 26 associated with network adapter resident application software 26, or application software of the user's choice, may be stored.

Network adapter 10 may include updating logic 32 configured to search for, identify, and/or download a newer version of resident application software 24 and/or new application software via communications network 14, such as the Internet or an Intranet, when network adapter 10 is plugged a host computer 12, and thereby to update and/or modify resident application software 24 included in network adapter 10 automatically and/or on demand.

Furthermore, network adapter 10 may include a security feature 34 that is configured to check and/or verify the identity of a user before resident application software 24 is activated/run and/or optionally before a communications network connection is made. For example, a request may be presented to the user to reveal an identity and/or other authentication information and/or authorization information.

Figure 5:
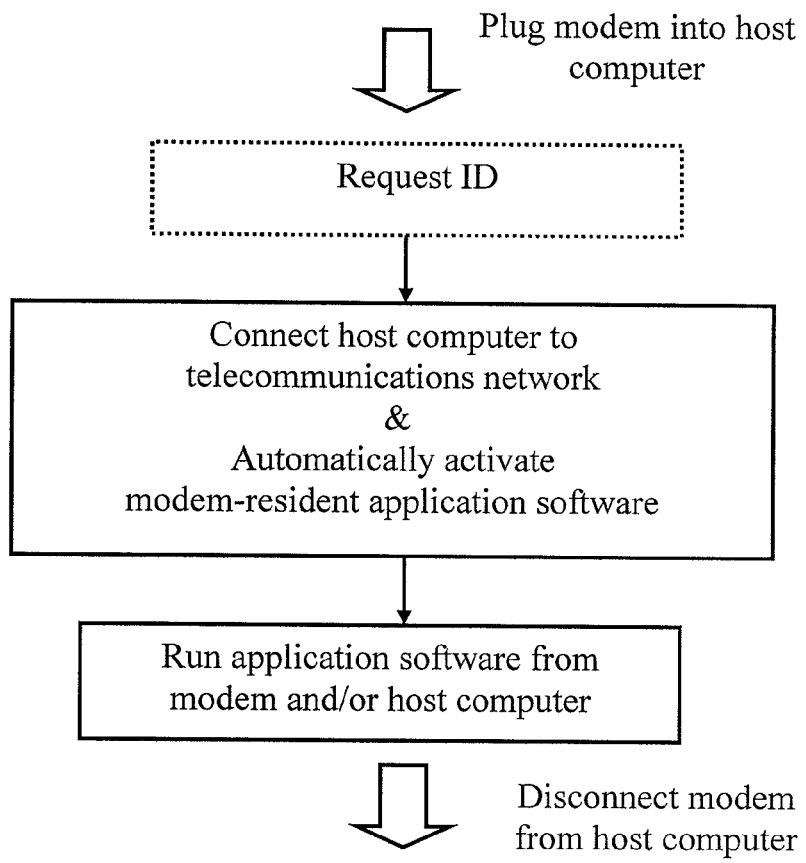
FIG. 5 is a flow diagram showing the actions carried out by a network adapter according to an embodiment of the invention.

FIG. 5 is a flow diagram showing the actions carried out by network adapter 10 according to an embodiment of the invention. Once a network adapter 10 is plugged into host computer 12, network adapter 10 may be configured to check and verify the identification of the user. If the user is found to be an authorized user, network adapter 10 may proceed to connect host computer 12 to one or more communications networks 14 and automatically activate network adapter-resident application software 24. One or more applications may then be run from network adapter 10 and/or host computer 12 until network adapter 10 is disconnected from host computer 12.

Further modifications of the invention within the scope of the claims would be apparent to a skilled person.

What is claimed is:

1. A method comprising:
   connecting, by a network adapter, a device to a network;
   activating, by the network adapter, application software stored in an internal memory of the network adapter based on connecting the device to the network;
   downloading, by the network adapter and via the network, other application software in response to activating the application software; and modifying, by the network adapter, the application software based on the downloaded other application software.

2. The method of claim 1, further comprising:
verifying, by the network adapter, an identity of a user of the device, the application software being activated based on verifying the identity of the user.

3. The method of claim 1, further comprising:
connecting the network adapter to the device;
providing information identifying a plurality of applications to the device;
receiving a selection of one of the plurality of applications; and
activating the application software based on receiving the selection.

4. The method of claim 1, further comprising:
storing data associated with the application software in the internal memory of the network adapter based on downloading the other application software.

5. The method of claim 1, further comprising:
determining that the device is disconnected from the network; and
automatically de-activating the application software based on the device being disconnected from the network.

6. The method of claim 1, further comprising:
determining that the network adapter is connected to the device, the network adapter connecting the device to the network in response to being connected to the device.

7. The method of claim 1, further comprising:
executing the modified application software from the internal memory, the modified application software not being uploaded or installed on the device prior to the execution of the modified application software.

8. A system comprising:
a first device comprising:
an internal memory to store an application software, the first device to:
connect a second device to a network, the second device being different from the first device,
activate the application software in response to connecting the second device to the network,
download, via the network, other application software in response to activating the application software, and
modify the application software based on the downloaded other application software.

9. The system of claim 8, where the first device is further to:
verify an identity of a user of the second device, the application software being activated based on verifying the identity of the user.

10. The system of claim 8, where the first device is further to:
connect to the second device, the first device connecting to the second device via a wireless connection that enables the second device to be connected to the network.

11. The system of claim 8, where the first device is further to:
connect to the second device,
provide information identifying a plurality of applications to the second device, based on the first device being connected to the second device,
receive a selection of one of the plurality of applications, and
activate the application software based on receiving the selection.

12. The system of claim 8, where the first device is further to:
determine that the second device is disconnected from the network, and
deactivate the application software in response to the second device being disconnected from the network.

13. The system of claim 8, where the first device is further to:
determine that the first device is connected to the second device, and
connect the second device to the network in response to the first device being connected to the device.

14. The system of claim 8, where the first device is further to:
execute the modified application software from the internal memory, the modified application software not being uploaded or installed on the second device prior to the execution of the modified application software.

15. A device comprising:
a connector to connect an adapter to a host device, and
the adapter including an internal memory portion to store an application software, the adapter to execute the application software to:
connect the host device to a network when the connector connects the adapter to the host device,
activate the application software based on connecting the host device to the network,
determine that an update, associated with the application software, is available based on connecting the host device to the network,
automatically download the update, the update being stored in the internal memory portion, and
modify the application software based on the downloaded update.

16. The device of claim 15, where the adapter is further to:
determine that the adapter is disconnected from the host device, and
de-activate the application software based on the adapter being disconnected from the host device.

17. The device of claim 15, where the connector connects the adapter to the host device via a wireless connection that enables the adapter to connect the host device to the network.

18. The device of claim 15, where the adapter is further to:
execute the application software from the internal memory portion based on the application software being activated.

19. The device of claim 15, where the adapter is further to:
use a processor of the host computer to execute the application software based on activating the application software.

20. The device of claim 15, where the adapter is further to:
install the application software on the host device,
determine that the host device is disconnected from the network,
automatically uninstall the application software based on the host device being disconnected from the network.

* * * * *